US012229307B2

(12) United States Patent
Vedula et al.

(10) Patent No.: US 12,229,307 B2
(45) Date of Patent: Feb. 18, 2025

(54) MANAGED DATA ASSETS FOR ELECTRONIC DEVICES

(71) Applicant: Apple Inc., Cupertino, CA (US)

(72) Inventors: Srinivas Vedula, Fremont, CA (US); Joel N. Kerr, San Jose, CA (US); Yuehhsun Lin, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 394 days.

(21) Appl. No.: 17/590,808

(22) Filed: Feb. 1, 2022

(65) Prior Publication Data

US 2022/0327233 A1 Oct. 13, 2022

Related U.S. Application Data

(60) Provisional application No. 63/173,356, filed on Apr. 9, 2021.

(51) Int. Cl.
*G06F 21/00* (2013.01)
*G06F 21/62* (2013.01)
*H04L 9/40* (2022.01)
*H04L 67/5683* (2022.01)

(52) U.S. Cl.
CPC ...... *G06F 21/6245* (2013.01); *H04L 63/0428* (2013.01); *H04L 67/5683* (2022.05); *G06F 2221/2117* (2013.01); *G06F 2221/2141* (2013.01)

(58) Field of Classification Search
CPC ......... G06F 21/6245; G06F 2221/2117; G06F 2221/2141; G06F 21/6218; H04L 63/0428; H04L 67/5683
See application file for complete search history.

(56) References Cited

U.S. PATENT DOCUMENTS

| 9,619,633 | B1 | 4/2017 | Mortensen |
| 10,902,237 | B1 | 1/2021 | Aggarwal et al. |
| 11,405,339 | B1* | 8/2022 | Barki ............... H04L 51/18 |
| 2010/0268557 | A1 | 10/2010 | Faith et al. |
| 2013/0083065 | A1* | 4/2013 | Schulze ............ G06Q 30/06 |
| | | | 345/633 |

(Continued)

OTHER PUBLICATIONS

International Search Report and Written Opinion from PCT/US2022/023561, dated Jul. 8, 2022, 10 pages.

*Primary Examiner* — William A Corum, Jr.
(74) *Attorney, Agent, or Firm* — BAKERHOSTETLER

(57) ABSTRACT

The disclosed technology provides for secure storage and usage of data at an electronic device. A device may include a hardened data manager that securely stores data associated with users of the device and/or another device. An application that does not have access to the securely stored data can still use the securely stored data by requesting that another system process at the device perform operations on the securely stored data and/or one or more updates to the securely stored data. For example, an application can request rendering of an avatar of a user. A rendering engine, separate from the application, can obtain securely stored base data from the hardened data manager, obtain updates to the securely stored base data, and render the avatar using the updates to the securely stored base data, without exposing the securely stored base data to the application.

21 Claims, 8 Drawing Sheets

(56) References Cited

U.S. PATENT DOCUMENTS

2015/0312523 A1 10/2015 Li et al.
2019/0320144 A1 10/2019 Tong et al.
2020/0193053 A1 6/2020 Murphy et al.

* cited by examiner

US 12,229,307 B2

MANAGED DATA ASSETS FOR ELECTRONIC DEVICES

CROSS REFERENCE TO RELATED APPLICATIONS

This application claims the benefit of priority to U.S. Provisional Patent Application No. 63/173,356, entitled "Managed Data Assets For Electronic Devices," filed on Apr. 9, 2021, the disclosure of which is hereby incorporated herein in its entirety.

TECHNICAL FIELD

The present description relates generally to electronic devices, including, for example, managed data assets for electronic devices.

BACKGROUND

Personally identifiable information (PII) of a user can be securely stored at an electronic device by, for example, encrypting the PII using a key that is known only to the user. However, encryption of data alone can prevent or inhibit use of the PII at the device in ways that would be desirable to the user.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
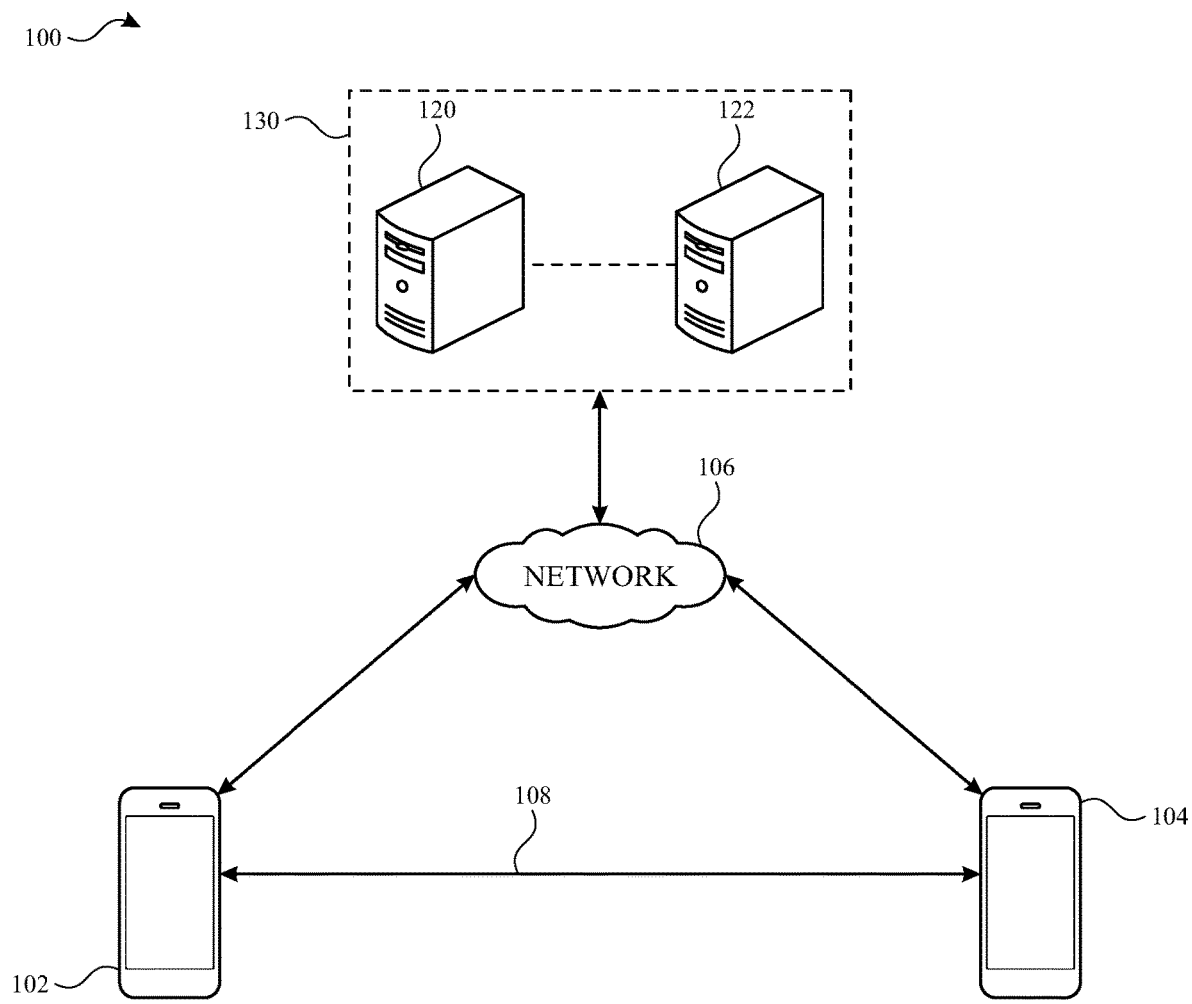
FIG. 1 illustrates an example network environment that may implement one or more aspects of the subject technology in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Providing XR environments can benefit from the use of information that can be associated with a particular user, and can thus be subject to privacy considerations. User-associated data can include data associated with the user's body, such as two or three-dimensional data representing the user's face, expressions, hand(s), arm(s), eye(s), hair, eyebrows, facial hair, or characteristic movements, gaze information, or other body-related information. User-associated data can also include information associated with the physical environment of the user, including an audio head-related transfer function (HRTF), room acoustic information, spatial audio information, scene information, room reconstruction information, object information, materials information, prescription lens information, or other environmental information that could include or be processed to reveal personally identifiable information (PII) or other private data for a user.

Accordingly, allowing first party applications (e.g., applications provided by a manufacturer of a device or by an operating system provider for the device) and/or third party applications (e.g., applications provided providers other than the manufacturer of a device and the operating system provider for the device) to benefit from the use of private data (e.g., personally identifiable information (PII), also referred to herein as secure data assets) at the user's own device, in a secure, privacy-preserving manner, can be beneficial. Moreover, XR systems often provide multi-user capabilities in which PII for multiple users is stored and/or used at one device, and/or group experience capabilities in which PII of a remote user of a remote device is used as part of an XR environment at a local device.

In accordance with aspects of the disclosure, secure storage and management of private data such as personally identifiable information (PII) is provided, for both on-device operations at a device of a user, and for shared experiences such as experiences in which two or more users are concurrently present in a common XR environment. In one or more implementations, management of secure data assets, such as PII, can include an enrollment operation in which base PII (e.g., an initial base mesh of a user and/or a physical environment and/or any other personally identifiable information) is captured and securely stored as enrollment data.

In subsequent operations of an application that uses the enrollment data (e.g., to render an avatar that corresponds in real time to the movements of the user), a change in the base PII can be captured and applied to the securely stored enrollment data (e.g., the initial base mesh) by a system process that is outside of the application. In this way, the base PII can be used by the application, but is never exposed to the application. In one or more implementations, these data asset management operations can be performed on-device for a user of the device (e.g., where the enrollment data is data for the user of the device). In one or more implementations, the data asset management can be performed for shared experiences (e.g., where the enrollment data is for a user of a remote device).

In one or more implementations, in order to allow a remote device to, for example, render and animate an avatar of a local user, the local device can send (after obtaining permission and/or opt-in from the local user) the initial base mesh of the user (e.g., local user enrollment data) to the remote device first for secure temporary storage at the remote device, and can later send only updates to the initial base mesh for animation. At the remote device, the updates received from the local device are applied to the securely stored enrollment data for the local user, by a system-level process at the remote device according to a policy provided by the local device, and without exposing the enrollment data to applications at the remote device.

FIG. 1 illustrates an example network environment 100 for secure data asset management identification in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 102, an electronic device 104, a network 106, and one or more servers 130. The network 106 may communicatively (directly or indirectly) couple, for example, any two or more of the electronic device 102, the electronic device 104, and/or the servers 130. The servers 130 may include, as examples, an application server 120, and a cloud server 122.

In one or more implementations, the network 106 may be an interconnected network of devices that may include, or may be communicatively coupled to, the Internet. In one or more implementations, the electronic device 102 and the electronic device 104 can communicate over a direct link 108 (e.g., a wired or wireless link such as a WiFi connection or a Bluetooth connection), and/or an indirect link, such as through the network 106, and/or one or more intermediary devices and/or servers. For explanatory purposes, the network environment 100 is illustrated in FIG. 1 as including a single electronic device 102, a single electronic device 104, a single application server 120 and a single cloud server 122; however, the network environment 100 may include any number of electronic devices and servers.

The electronic device 102 may be, for example, a portable computing device such as a laptop computer, a smartphone, a peripheral device (e.g., a digital camera, headphones), a tablet device, a wearable device such as a watch or a head mountable device, a band, and the like, or any other appropriate device that includes one or more wireless interfaces, such as near-field communication (NFC) radios, WLAN radios, Bluetooth radios, Zigbee radios, cellular radios, and/or other wireless radios. In FIG. 1, by way of example, the electronic device 102 is depicted as a mobile device. The electronic device 102 may be, and/or may include all or part of, the data manager discussed below with respect to FIG. 2, and/or the electronic system discussed below with respect to FIG. 10.

The electronic device 102 may communicate with the electronic device 104 via the network 106 and/or via a direct communication (e.g., peer-to-peer communication), such as NFC, Bluetooth, and/or Wi-Fi Aware that bypasses the network 106. In one or more implementations, the electronic device 102 may communicate with the electronic device 104 over the network 106 and/or the electronic device 104

(and/or the electronic device 102) may not be communicatively coupled to the network 106.

In one or more implementations, a user and/or an application of the electronic device 102 may wish to utilize data that is associated with the user of the electronic device 102 and/or data associated with a user of the electronic device 104.

Figure 2:
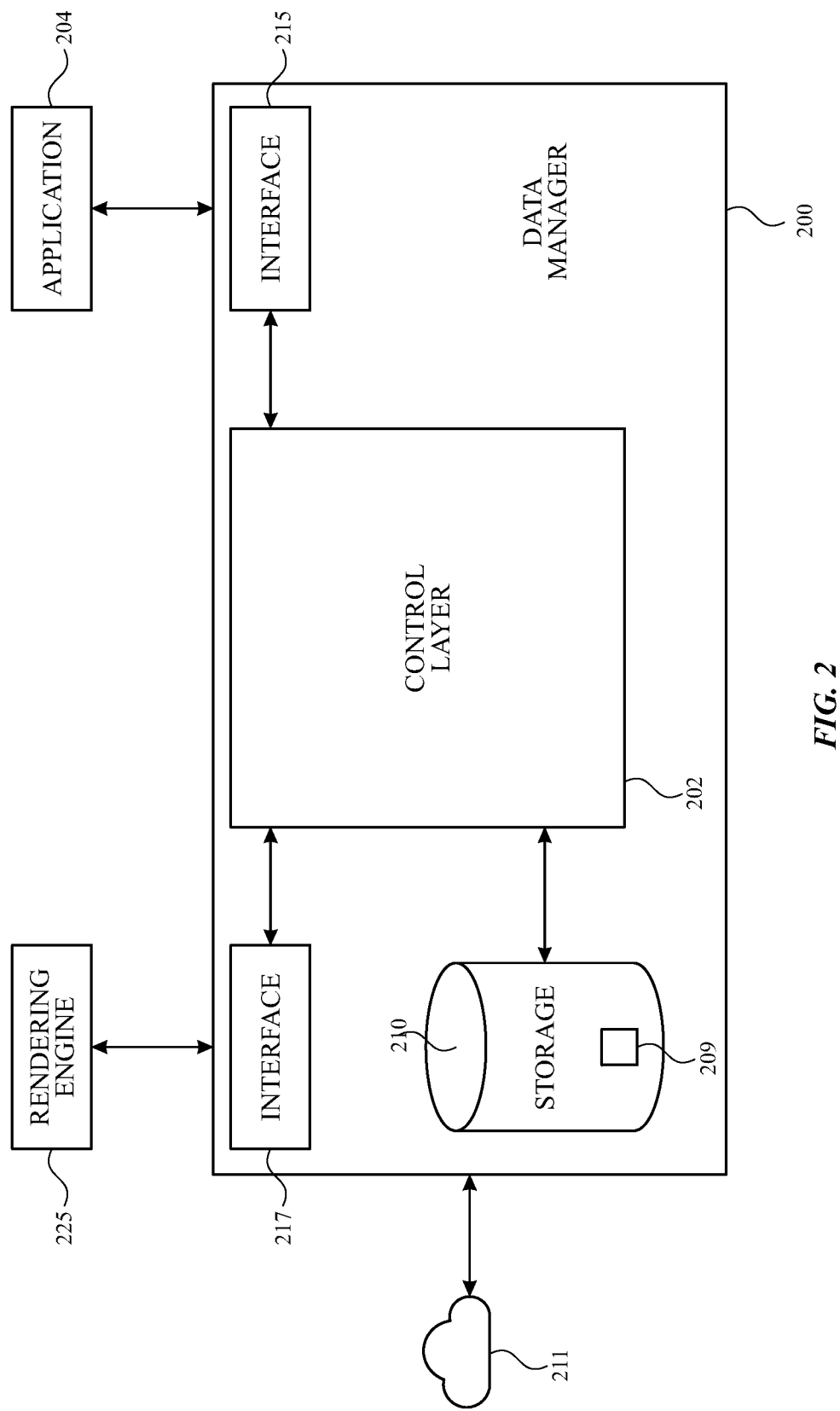
FIG. 2 illustrates an example data manager in accordance with one or more implementations.

FIG. 2 illustrates aspects of an example data manager 200 that may be implemented the electronic device 102 and/or the electronic device 104 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The data manager 200 may be a hardened data manager that manages access to private data (e.g., PII or other user-associated data, such as enrollment data 209) that is securely stored by the data manager 200, such as in secure storage 210. In the example of FIG. 2, the secure storage 210 is shown as being a part of the data manager 200. However, the secure storage 210 may be separate from the data manager 200. For example, the private data (e.g., enrollment data 209) that is stored in the secure storage 210 may be encrypted using a key that accessible only to the data manager 200 and that is inaccessible to any applications and/or processes outside of the data manager. For example, the key may be stored in a secure element and/or a secure enclave processor. In one or more implementations, the secure storage 210 may be a portion of other device memory that is secured by the encryption of the data by the data manager, and/or the secure storage 210 may be hardened storage that is physically accessible only via the data manager 200.

In the example of FIG. 2, data manager 200 is also provided with access to remote storage 211, such as on-device memory that is separate from the secure storage 210 and/or off-device storage such as cloud storage. In the example of FIG. 2, data manager 200 also includes a control layer 202 configured to receive and respond to requests from one or more applications, such as application 204, at the device via an interface 215. In the example of FIG. 2, the control layer 202 of the data manager 200 is also configured to receive and respond to requests from one system processes at the device, such as a rendering engine 225, via an interface 217. As shown, the control layer 202 of the data manager 200 may receive requests from application 204 and/or rendering engine 225 and respond to the requests, as described in further detail hereinafter, in a manner that prevents the private data (e.g., enrollment data 209) from being exposed to the applications at the device, and/or prevents any keys for accessing the private data (e.g., enrollment data 209) from being exposed to the applications or the system processes at the device. In one or more implementations, all or part of the data manager 200 may be implemented by a secure processor and/or a secure enclave processor.

Figure 3:
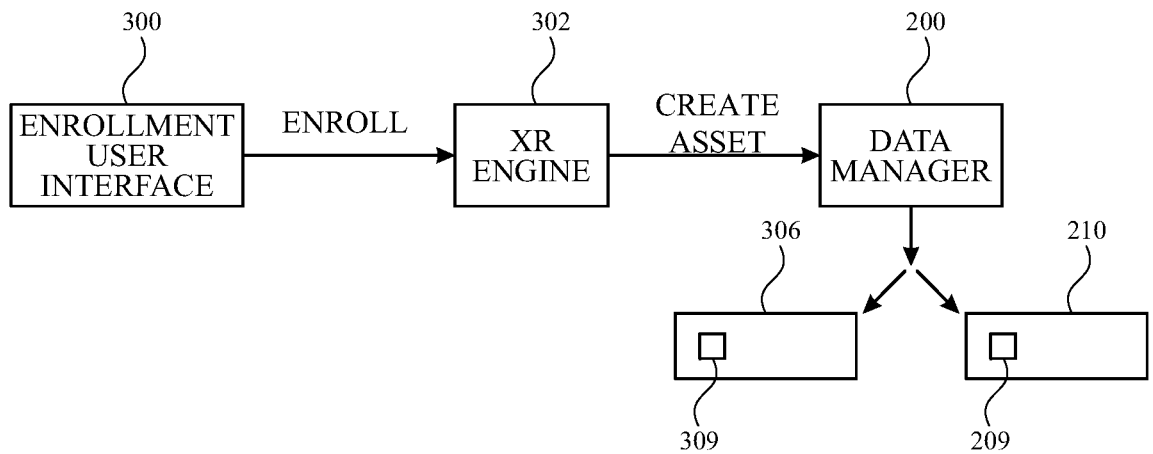
FIG. 3 illustrates a flow diagram of an example enrollment process in accordance with one or more implementations.

FIG. 3 illustrates aspects of an enrollment process that may be performed at an electronic device such as electronic device 102 or electronic device 104, in one or more implementations. The enrollment process may be performed to establish a base dataset that is private and managed by the data manager 200. In the example of FIG. 3, an enrollment process for XR data is shown. However, it is appreciated that other types of enrollment data may be provided by a user and/or generated by an electronic device for other types of private data. In the example of FIG. 3, an enrollment user interface 300 (UI) may be provided by the electronic device, with which a user of the device can provide input data (e.g., using data stored at the device, or generated using one or more cameras and/or one or more sensors of the electronic device). For example, the enrollment UI 300 may prompt the user to provide or capture input data corresponding to images and/or depth information for the user and/or a physical environment of the user.

As shown, the enrollment UI 300 may request, in one example, enrollment of an avatar for the user, based on the input data, by an XR engine 302 of the device. The XR engine 302 may generate a base mesh for the avatar using the input data, and provide the base mesh to the data manager 200. The data manager 200 may encrypt the base mesh, and store the encrypted base mesh as enrollment data 209 in the secure storage 210. In one or more implementations, the XR engine 302 and/or the data manager 200 may also generate metadata 309 corresponding to the enrollment data 209. As shown, the data manager 200 may store the metadata 309 unencrypted in storage 306, at the device, that is separate from the secure storage 210. For example, the storage 306 may be a standard query language (SQL) database. The metadata 309 may include, as examples, a type, a label, a version, a time, a file identifier, a user identifier, and/or other information that can be used for queries to the data manager for the enrollment data. For example, in one or more implementations, enrollment data for multiple users may be encrypted and stored in the secure storage 210. In one or more implementations, the encryption of the enrollment data may be a common encryption of data for all users (e.g., a non-user-specific encryption), where the encrypted data for each user is stored with an identifier of the corresponding user. The data manager may then enforce access to enrollment data for each user based on policies held by the data manager for that user, using the decryption key that is only available within the data manager.

Figure 4:
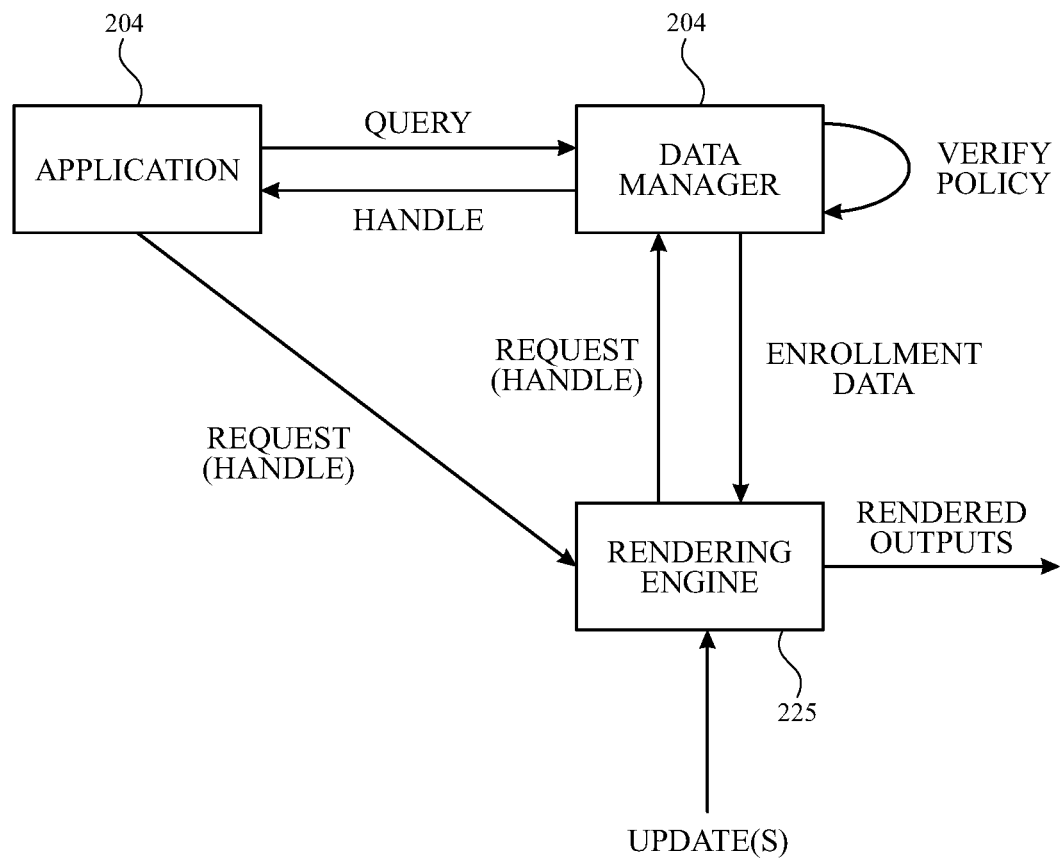
FIG. 4 illustrates a flow diagram of an example on-device data management process in accordance with one or more implementations.

FIG. 4 illustrates aspects of process for managed access to private data that may be performed at an electronic device, such as electronic device 102 or electronic device 104, in one or more implementations. As described herein, a device may include a hardened data manager, such as data manager 200, that securely stores data (e.g., enrollment data 209) associated with users of the device and/or another device. As shown in FIG. 4, an application, such as application 204, that does not have access to the securely stored data can still use the securely stored data by requesting that another system process (e.g., the data manager 200 and/or a rendering engine 225) at the device perform operations on the securely stored data and/or one or more updates to the securely stored data.

For example, an application 204 can provide a query to the data manager 200 to request information associated with enrollment data for the user of the device or for a user of a remote device. As shown, the data manager 200 may provide information (e.g., a handle, such as an opaque handle, which can be formed by, for example, a random number or a hash of the enrollment data that is mapped to specific enrollment data by the data manager) to the application 204, responsive to the query. The handle may be an identifier of specific enrollment data 209, that can be mapped only by the data manager, to the specific enrollment data 209.

The application 204 may then use the information (e.g., the handle) to request rendering of an avatar of a user by a rendering engine 225 of the device. The application 204 may provide the information (e.g., the handle) received from the data manager 200 to the rendering engine 225 with the request. In one or more implementations, the rendering engine 225 may recognize the information (e.g., the handle) as corresponding to data that is managed by the data manager. The rendering engine 225, separate from the application 204, can obtain the securely stored base data from the data manager, for example, by providing the handle for the enrollment data to the data manager 200. The rendering engine 225 may verify a policy corresponding to the requested enrollment data, and decrypt the enrollment data for the rendering engine 225 if the policy is satisfied by the request from the rendering engine. As shown, the rendering engine 225 may also obtain updates to the securely stored base data, and render the avatar using the updates to the securely stored base data, without exposing the securely stored base data to the application. For example, the rendering engine 225 may receive changes corresponding to a current time with respect to the base data, where the changes are not identifiable as corresponding to the user.

Although the rendering engine 225 is depicted in FIG. 4 as a single entity, the rendering engine 225 may encompass one or multiple system processes, such as a process that obtains combines enrollment data and updates to the enrollment data, a process that generates other virtual content, and/or one or more processes that render the updated enrollment data and/or the other virtual content.

Figure 5:
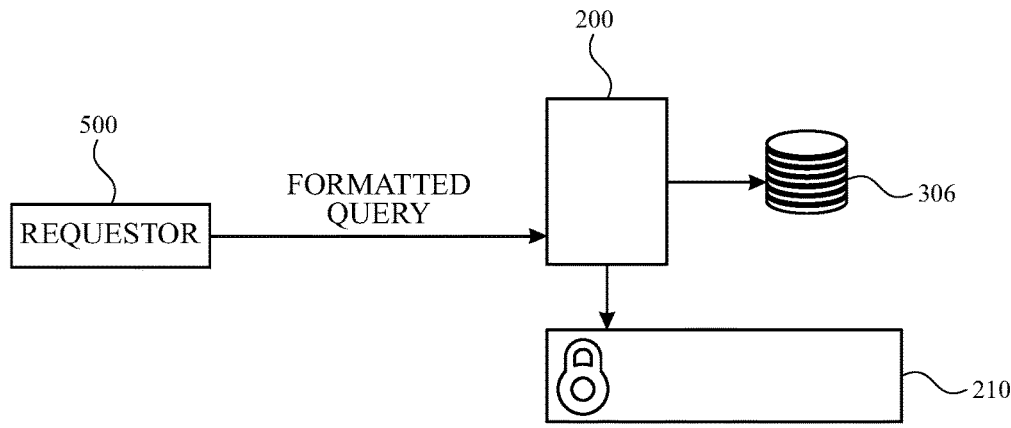
FIG. 5 illustrates a flow diagram of an example process for requesting information from a data manager in accordance with one or more implementations.

In one or more implementations, to provide a hardened data manager for a device, the data manager 200 may be configured to exclusively control access to the secure storage 210 and the storage 306, and may be accessible only via messages to the data manager in a predetermined format (e.g., a predetermined query format), as illustrated in FIG. 5. For example, a requestor 500 (e.g., an application 204 or a rendering engine 225) may provide a query to the data manager 200 for a handle or for enrollment data using a formatted query. The data manager 200 may, for example, be a sandboxed process having mandatory access control rules on a set of directories. For example, access may be allowed only for entitled binaries, such as binaries that have been granted access by the data manager 200 and/or another operating system-level secure process. The data manager may overrule all other file permissions, and may provide protection from malware, spyware, and/or compromised system processes outside of the (e.g., hardened) data manager sandbox.

Data stored in the secure storage 210 may only be decrypted by the data manager 200, which can thus enforce policies on the data, such as only providing the unencrypted data to the rendering engine 225 and/or other authorized system processes, and not to applications such as application 204. Moreover, the secure storage 210 may also be sandboxed storage that is accessible only by the data manager 200.

In one or more implementations, a device that is providing usage of enrollment data for a user of a device may determine that the user has set down the device, or taken off a wearable device. The device (e.g., a system process at the device) may notify the data manager 200 of a potential user change responsive to the detection, and the data manager 200 may lock access to the enrollment data for the user (e.g., while the device itself is also locked or remains unlocked). When the device is again picked up or put on (e.g., for a wearable device), the device may determine whether the user has changed. If a change in user is detected, the data manager 200 may switch all PII data and policies for data access to the new user. In this way, the application 204 and/or the rendering engine 225 may continue to provide usage of enrollment data for a current user, without the application and/or the rendering engine modifying operations or even being aware of the change in user. For example, the application and/or the rendering engine may be notified to re-fetch the data for the current user from the data manager, and the data manager may provide information and/or enrollment data only for the current user according to the policies set by and/or for the current user. In one or more implementations, data of the different users can be isolated by using different encryption keys for encrypting the data for the different users. In one example, the encryption keys may be dynamically generated when the user first puts the device on and/or performs an enrollment process (e.g., based on the user's enrollment data such as by hashing the user's enrollment data).

In one or more implementations, if the device is unable to identify the new user (e.g., because the new user is a guest user that does not have enrollment data at the device), the enrollment user interface 300 may be provided (e.g., surfaced) to prompt the guest user to perform a new enrollment process, or default (e.g., non-user specific data, such as data for a generic avatar) may be used by the rendering engine while the guest user is using the device.

In one or more implementations, applications at the device can be notified of changes to a physical environment, such as a changes to the room in which the device is being operated. For example, the rendering engine and/or the data manager may notify an application to update spatial audio or other application-generated content due to the detected change. In one or more implementations, the data manager may control access to enrollment data based on a location of the device or a time period. For example, the data manager may reject requests for the enrollment data when the device is outside the location or request outside the time period. In one or more implementations, data manager 200 may store encrypted data in a remote location, such as remote storage 211. In this way, the data manager may securely distribute asset data across the world for faster download, and/or or speed up session establishment.

Figure 6:
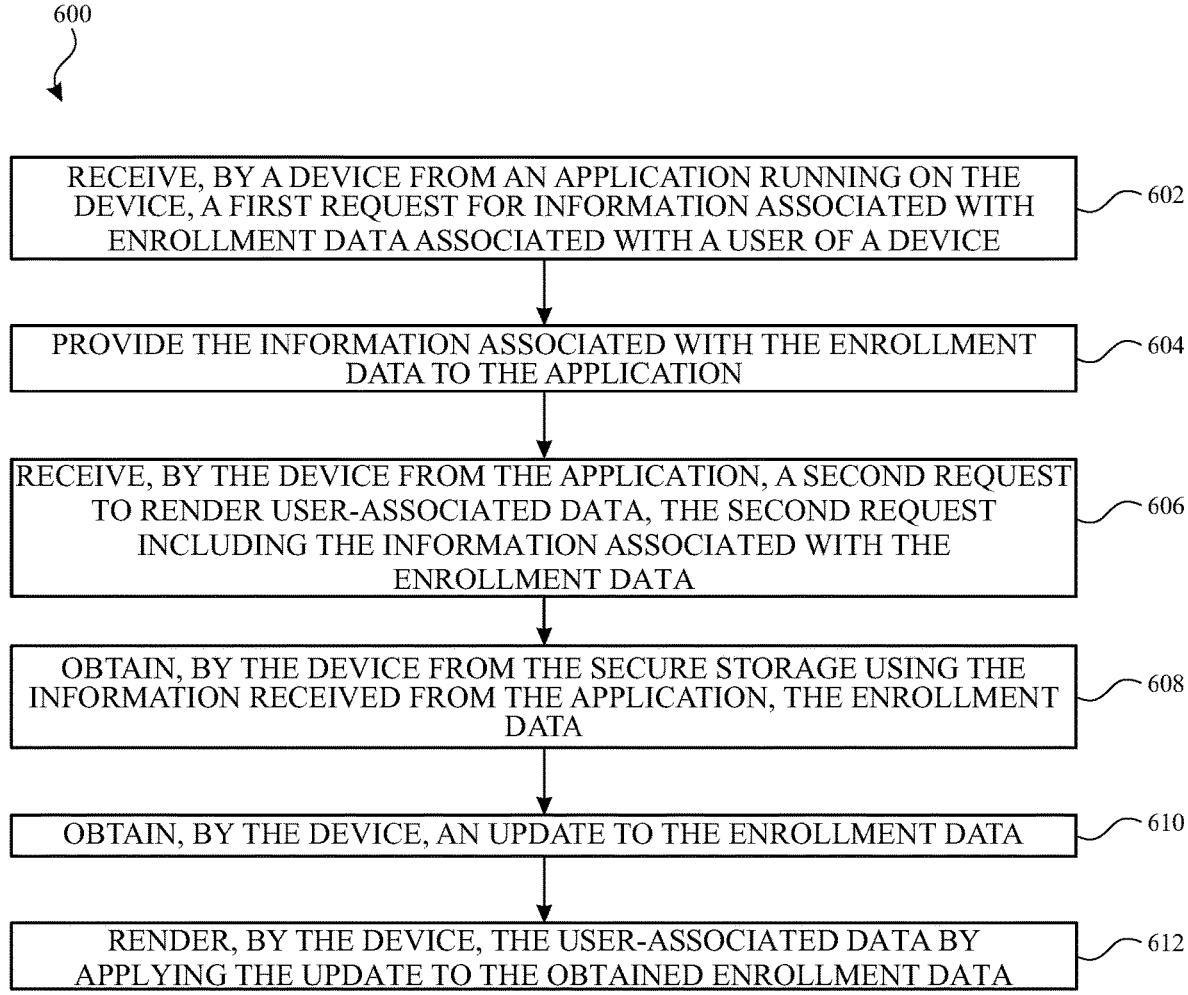
FIG. 6 illustrates a flow chart of example operations for rendering of secure data in accordance with one or more implementations.

FIG. 6 illustrates a flow diagram of an example process 600 for data asset management at an electronic device in accordance with implementations of the subject technology. For explanatory purposes, the process 600 is primarily described herein with reference to the electronic device 102 of FIG. 1. However, the process 600 is not limited to the electronic device 102 of FIG. 1, and one or more blocks (or operations) of the process 600 may be performed by one or more other components of other suitable devices. Further for explanatory purposes, some of the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

As illustrated in FIG. 6, at block 602, a device (e.g., electronic device 102) may receive (e.g., at a data manager 200), from an application (e.g., application 204) running on the device, a first request for information associated with enrollment data (e.g., enrollment data 209) associated with a user of a device. The enrollment data may be stored in secure storage (e.g., secure storage 210) at the device, the secure storage inaccessible by the application. The first request may be, for example, a request for information corresponding to enrollment data for a current user.

At block 604, information (e.g., an opaque handle that itself does not include any identifying information that can be used without the mapping knowledge of the data manager) associated with the enrollment data may be provided (e.g., by the data manager 200) to the application.

At block 606, the device may receive, from the application (e.g., at a rendering engine 225), a second request to render user-associated data corresponding to the user, the second request including the information associated with the enrollment data.

Responsive to the second request, the device (e.g., the rendering engine 225) may obtain (block 608), from the secure storage using the information received from the application, the enrollment data, obtain (block 610) an update to the enrollment data, and render (block 612) the data corresponding to the user by applying the update to the obtained enrollment data.

In one or more implementations, the user-associated data corresponding to the user includes a three-dimensional representation of a physical environment of the user. The physical environment of the user may include the user, a part (e.g., a face) of the user, and/or objects or environmental features of the physical environment surrounding the user. In one or more implementations, the enrollment data includes base data such as a three-dimensional mesh corresponding to the physical environment of the user. In one or more implementations, the update to the enrollment data corresponds to a change in the physical environment of the user as determined using a sensor of the device. For example, the second request to render the user-associated data corresponding to the user may be a request to render an avatar of the user. In this example, the rendering engine 225 may obtain the three-dimensional base mesh of the face of the user, obtain a difference update (e.g., due to a change in the position, orientation, expression, clothing, etc. of the user at the current time relative to the time when the three-dimensional base mesh was enrolled) using a camera (and/or other sensor(s)) of the device, and render the avatar by applying the difference update to the three-dimensional base mesh of the face of the user.

As described herein, the device may include a rendering engine 225 and a data manager 200 that has exclusive access to the secure storage 210 at the device. The data manager 200 may receive the first request for the information associated with the enrollment data, and provide the information to the application (e.g., as described herein in connection with FIG. 4). The rendering engine 225 may receive the second request to render the user-associated data corresponding to the user, obtain the enrollment data from the secure storage by requesting the enrollment data from the data manager using the information received from the application, receive the update to the enrollment data; and render the user-associated data corresponding to the user by applying the update to the obtained enrollment data.

In one or more implementations, the data manager 200 stores the enrollment data in the secure storage 210, in part, by encrypting the enrollment data 209 using a key that is inaccessible outside the data manager. The data manager 200 may also store unencrypted metadata (e.g., metadata 309) corresponding to the encrypted enrollment data to provide for searchable queries to the encrypted enrollment data.

In one or more implementations, prior to receiving the first request, from the application, for the information associated with the enrollment data, the device (e.g., the data manager 200) may generate, by an enrollment process associated with the user of the device, the enrollment data associated with the user. The device (e.g., the data manager 200) may store the enrollment data in secure storage at the device. In one or more implementations the device (e.g., the data manager 200) may generate, by a separate enrollment process associated with another user of the device, additional enrollment data associated with the other user. The device (e.g., the data manager 200) may store the additional enrollment data in the secure storage at the device.

The operations described above in connection with FIG. 6 can be performed for on-device management of data, in various implementations. In other implementations, the subject technology can be applied to manage the exchange and use of data between devices.

Figure 7:
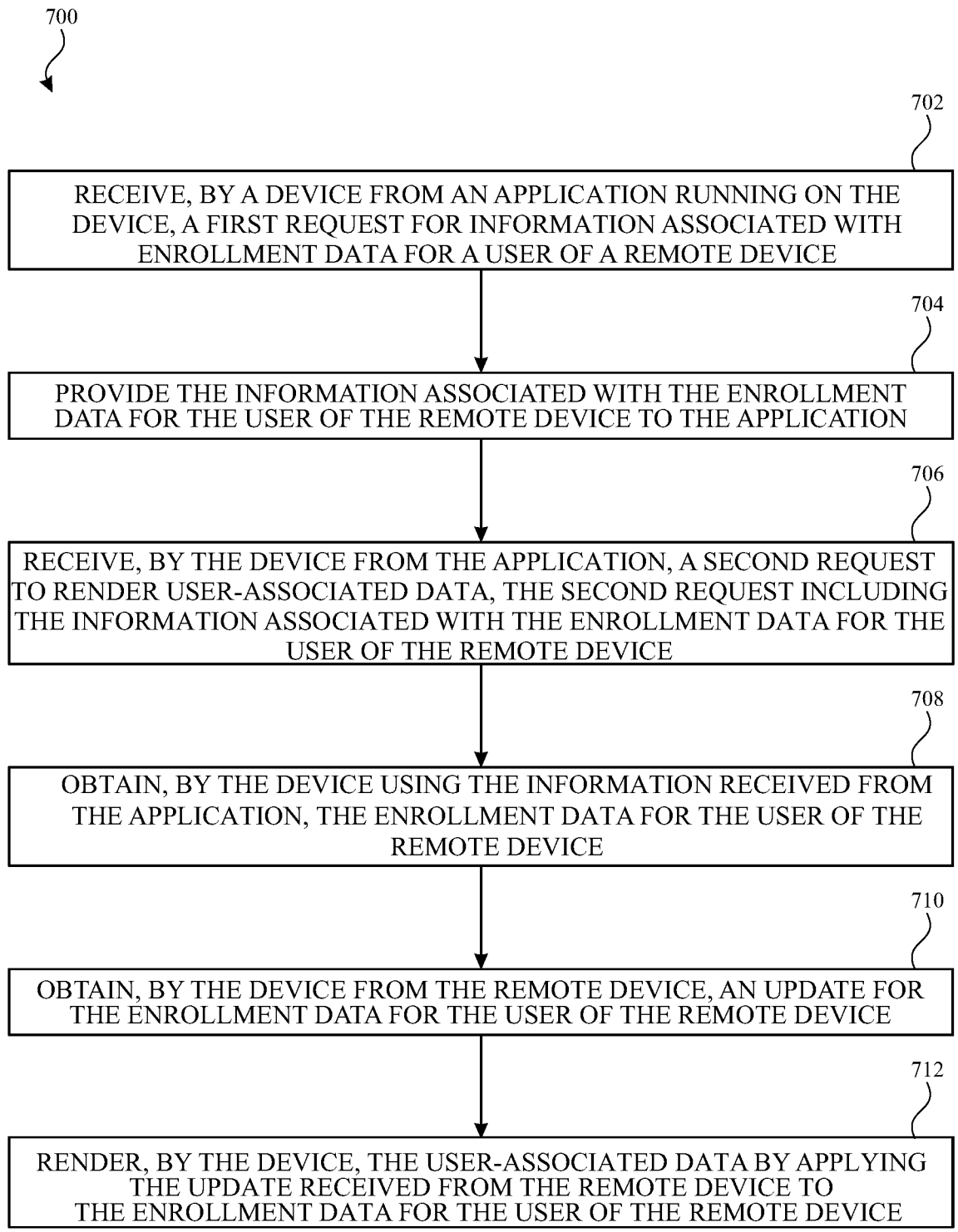
FIG. 7 illustrates a flow chart of example operations for rendering using secure data for a remote user in accordance with one or more implementations.

FIG. 7 illustrates a flow diagram of an example process 700 for data asset management between remote devices in accordance with implementations of the subject technology. For explanatory purposes, the process 700 is primarily described herein with reference to the electronic devices 102 and 104 of FIG. 1. However, the process 700 is not limited to the electronic devices 102 and 104 of FIG. 1, and one or more blocks (or operations) of the process 700 may be performed by one or more other components of other suitable devices. Further for explanatory purposes, some of the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

As illustrated in FIG. 7, at block 702, a device (e.g., electronic device 102) may receive (e.g., at data manager 200) from an application (e.g., application 204) running on the device, a first request for information associated with enrollment data for a user of a remote device (e.g., electronic device 104). The enrollment data for the user of the remote device may be stored in secure storage (e.g., secure storage 210) at the device, the secure storage inaccessible by the application.

At block 704, the information (e.g., an opaque handle) associated with the enrollment data for the user of the remote device may be provided (e.g., by the data manager 200) to the application.

At block 706, the device (e.g., the rendering engine 225) may receive, from the application, a second request to render user-associated data corresponding to the user of the remote device. The second request may include the information (e.g., the opaque handle) associated with the enrollment data for the user of the remote device.

Responsive to the second request, the device (e.g., the rendering engine 225) may obtain (block 708), from the secure storage using the information received from the application, the enrollment data for the user of the remote device, obtain (block 710), from the remote device (e.g., over a secure tunnel and from a camera and/or other sensor of the remote device), an update for the enrollment data for the user of the remote device, and render (block 712) the user-associated data corresponding to the user of the remote device by applying the update received from the remote device to the enrollment data for the user of the remote device.

In one or more implementations, the device may establish a secure connection with the remote device, and receive the enrollment data for the user of the remote device via the secure connection. The device may then store the enrollment data received from the remote device (e.g., electronic device 104) in the secure storage (e.g., the secure storage 210) at the device (e.g., electronic device 102). In one or more implementations, the electronic device 102 may also provide enrollment data (e.g., a base mesh or other base PII) to the remote electronic device (e.g., electronic device 104) for secure storage and management by a data manager 200 at the remote electronic device.

In one or more implementations, the user-associated data corresponding to the user of the remote device may include a three-dimensional representation of a physical environment of the remote device. In one or more implementations, the enrollment data may include a three-dimensional mesh (e.g., a three-dimensional base mesh) corresponding to the physical environment of the remote device. In one or more implementations, the update to the enrollment data corresponds to a change in the physical environment of the remote device as determined using a sensor (e.g., one or more cameras and/or one or more depth sensors or other sensors) of the remote device.

Providing the information associated with the enrollment data for the user of the remote device to the application may include providing the information without providing the enrollment data to the application. In this way, an application at a local device can benefit from the use of the enrollment data for a user of a remote device, without exposing the PII associated with the enrollment data (and private to the user of the remote device) to the application.

As described herein, in one or more implementations, the device may include a rendering engine (e.g., rendering engine 225) and a data manager (e.g., data manager 200) that has exclusive access to the secure storage at the device. The data manager may receive the first request for the information associated with the enrollment data for the user of the remote device, and provide the information to the application. The rendering engine may receive the second request to render the data corresponding to the user of the remote device. The rendering engine may also obtain the enrollment data for the user of the remote device from the secure storage by requesting the enrollment data for the user of the remote device from the data manager using the information (e.g., the opaque handle) received from the application. The rendering engine may receive the update to the enrollment data from the remote device, and render the user-associated data corresponding to the user of the remote device by applying the update received from the remote device to the enrollment data for the user of the remote device.

In one or more implementations, the data manager (e.g., data manager 200) may store the enrollment data for the user of the remote device in the secure storage, in part, by encrypting the enrollment data for the user of the remote device using a key corresponding to the remote device and a secure communication session with the remote device. The data manager may delete the key from the device upon termination of the secure communication session with the remote device.

Figure 8:
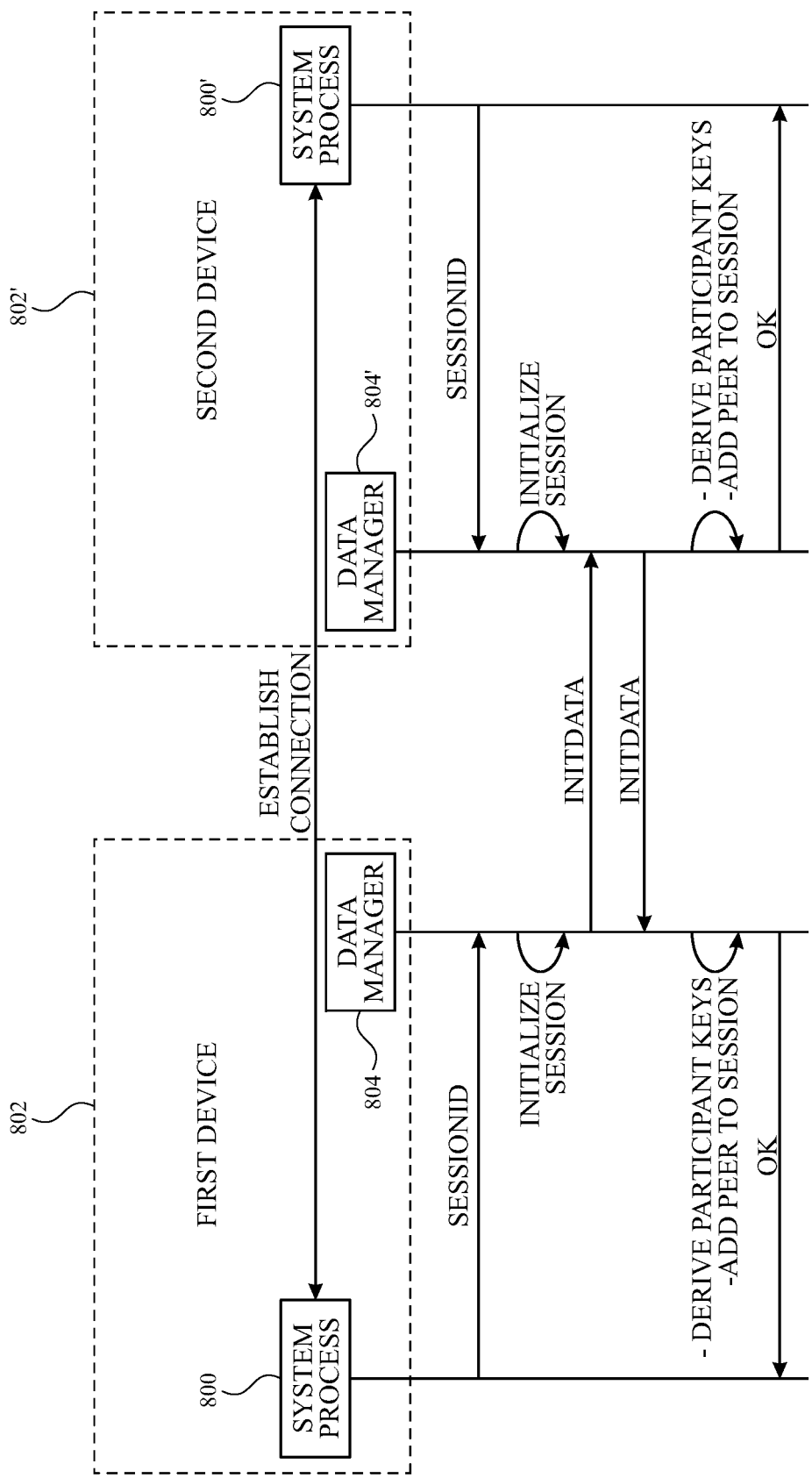
FIG. 8 illustrates a schematic diagram illustrating example data exchanges and processing operations for secure tunnel establishment between remote devices in accordance with one or more implementations.

FIG. 8 is a schematic diagram illustrating details of various data exchanges and/or operations that may be performed for establishing a remote secure tunnel between a device a remote device for operations including managed data in accordance with implementations of the subject technology. In the example of FIG. 8, a system process 800, 800' at respective first and second devices 802, 802' (e.g., implementations of electronic devices 102 and 104, respectively) may establish a secure connection. Once the secure connection is established, the respective data managers 804, 804' (e.g., each of which may be an implementation of the data manager 200 described herein) at the devices 802, 802' receive a session identifier from the respective system process 800, 800'. As shown, the respective data managers 804, 804' initialize the communication session, provide initiation data to the other respective data manager, derives one or more keys for encrypting and decrypting data to be stored at that device and/or transmitted to the other device, and indicate to the system process that the secure tunnel has been established. The operations described in FIG. 8 can be repeated when one or more additional participants joins the shared experience.

Figure 9:
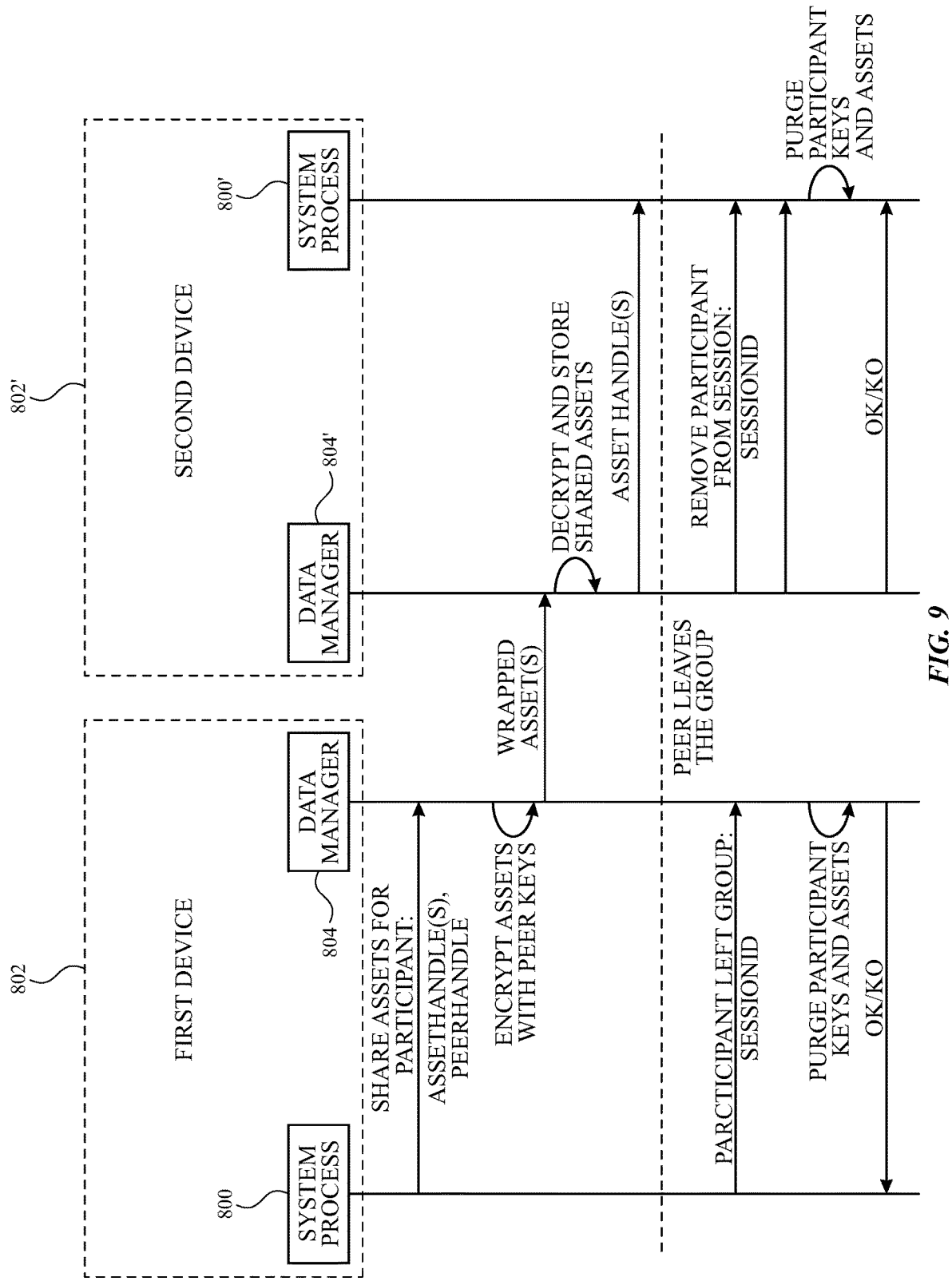
FIG. 9 illustrates a schematic diagram illustrating example data exchanges and processing operations for managing secure data exchanged between remote devices in accordance with one or more implementations.

FIG. 9 is a schematic diagram illustrating details of various data exchanges and/or operations that may be performed for management of remote data assets once the secure tunnel of FIG. 8 has been established in accordance with implementations of the subject technology. In the example of FIG. 9, the system process 800 of the first device 802 may provide a request to the data manager 804 at the first device 802 to provide enrollment data for the user of the first device to the second device 802' (e.g., using an opaque handle for the requested enrollment data and a handle identifying the peer associated with the second device 802'). The data manager 804 at the first device may then encrypt the enrollment data using a key (e.g., a peer key associated with the second device 802' and/or the secure communication session between the first device 802 and the second device 802', such as a public key obtained by the operations of FIG. 8). The encryption for transmission to the second device 802' may be additional to and/or separate from a local encryption of the enrollment data at the first device 802 for storage by the data manager 804.

As shown in FIG. 9, the data manager 804 of the first device 802 may then provide the encrypted enrollment data to the data manager 804' at the second device 802'. The data manager 804' at the second device 802' may then decrypt the enrollment data for the user of the first device 802 that was encrypted for transmission, and store the enrollment data for the user of the first device 802' securely in the secure storage at the second device 802' (e.g., by encrypting the enrollment data for the user of the first device 802' using a local key that is only accessible by the data manager 804' at the second device 802' and by storing the locally encrypted enrollment data). As shown, the data manager 804' at the second device 802' may then provide, to the system process 800', one or more opaque handles associated with the received enrollment data for the user of the first device 802 that is now stored by the data manager 804' of the second device 802' to the system process 800'.

FIG. 9 also illustrates how, when the second device 802' leaves the communication session, the system process 800 at the first device 802 can notify the data manager 804 that the second device 802' has left, and the data manager 804 can purge any keys associated with the second device 802', and/or any enrollment data stored for the user of the second device 802'. In one or more implementations, the data manager 804' of the second device 802' may also notify the system process 800' of the second device 802' to remove the participant from the session, and the system process 800' may purge any participant keys and/or data assets associated with the secure communication session. The data manager 804' of the second device 802' may also purge any keys and/or enrollment data associated with the user of the first device 802.

As illustrated in FIGS. 8 and 9, the system processes 800 and 800' may manage the network connections between the first device 802 and the second device 802', and the data managers 804, 804' locally enforce policies on enrollment data received from the other device. The system processes 800 and 800', or other system processes, may request the enrollment data from the when the connection starts. The system processes 800 and 800', or other system processes, may receive updates (e.g., deltas) to the enrollment data through a tunnel other than the tunnel by which the enrollment data was obtained. The system processes 800 and 800', or other system processes, may then perform rendering using the enrollment data managed locally by their respective data managers 804, 804', and the updates received from the other device.

In one or more implementations, the data manager 804' of the second device 802' enforces all policies for the enrollment data for the user of the first device 802, and the data manager 804 of the first device 802 enforces all policies for the enrollment data for the user of the second device 802'.

In one or more implementations, the data manager 200 may persist enrollment data for frequent contacts. For example, the data manager 200 may encrypt and continue to store the enrollment data for a remote user after a connection to the device of the remote user has ended, and then only decrypt the enrollment data when remote user again joins a secure communication session and provides the decryption key for the persisted enrollment data.

Figure 10:
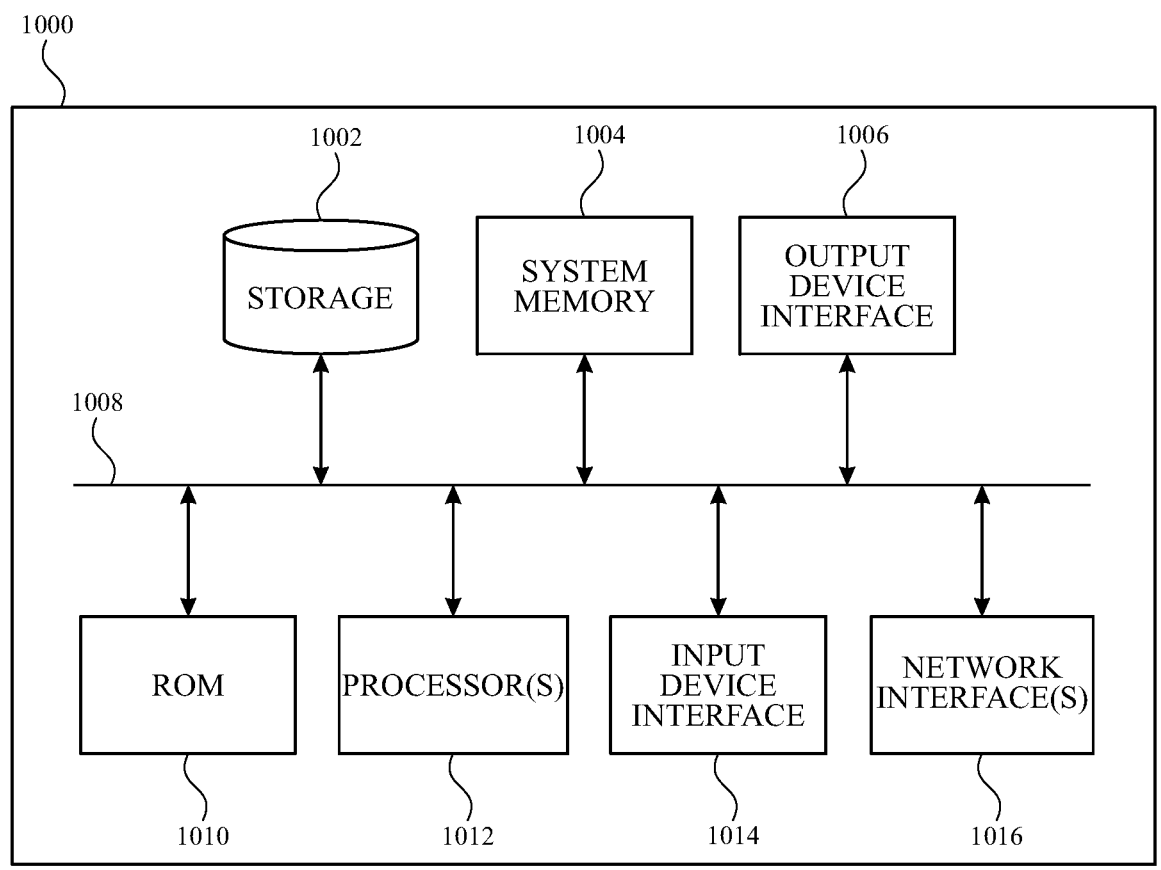
FIG. 10 conceptually illustrates an example electronic system with which aspects of the subject technology may be implemented in accordance with one or more implementations.

FIG. 10 conceptually illustrates an electronic system 1000 with which one or more implementations of the subject technology may be implemented. The electronic system 1000 can be, and/or can be a part of, the electronic device 102, the electronic device 104, and/or one or more of the servers 130 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the electronic device 102 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

The present disclosure recognizes that the use of personal information data, in the present technology, can be used to the benefit of users. For example, the personal information can be used in generating XR environments by a device and/or in a shared experience. Further, other uses for personal information data that benefit the user are also contemplated by the present disclosure. For instance, enrollment data, health and fitness data may be exchanged and used for generating XR environments at a local device or at a remote device.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of generating XR environments, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

In accordance with one or more aspects of the disclosure, a method is provided that includes receiving, by a device from an application running on the device, a first request for information associated with enrollment data associated with a user of a device, where the enrollment data is securely stored at the device in storage that is inaccessible by the application; providing the information associated with the enrollment data to the application; receiving, by the device from the application, a second request to render user-associated data corresponding to the user, the second request including the information associated with the enrollment data; and responsive to the second request: obtaining, by the device from the storage using the information received from the application, the enrollment data, obtaining, by the device, an update to the enrollment data, and rendering, by the device, the user-associated data by applying the update to the obtained enrollment data.

In accordance with one or more aspects of the disclosure, a method is provided that includes receiving, by a device from an application running on the device, a first request for information associated with enrollment data for a user of a remote device, where the enrollment data for the user of the remote device is securely stored at the device in storage that is inaccessible by the application; providing the information associated with the enrollment data for the user of the remote device to the application; receiving, by the device from the application, a second request to render user-associated data corresponding to the user of the remote device, the second request including the information associated with the enrollment data for the user of the remote device; and responsive to the second request: obtaining, by the device from the storage using the information received from the application, the enrollment data for the user of the remote device, obtaining, by the device from the remote device, an update for the enrollment data for the user of the remote device, and rendering, by the device, the user-associated data corresponding to the user of the remote device by applying the update received from the remote device to the enrollment data for the user of the remote device.

In accordance with one or more aspects of the disclosure, a device is provided that includes a memory securely storing enrollment data for a user of a remote device in secure storage that is inaccessible by applications at the device; and one or more processors. The one or more processors are configured to: receive, from an application running on the device, a first request for information associated with the enrollment data for the user of the remote device; provide the information associated with the enrollment data for the user of the remote device to the application; receive, from the application, a second request to render user-associated data corresponding to the user of the remote device, the second request including the information associated with the enrollment data for the user of the remote device; and responsive to the second request: obtain, from the memory using the information received from the application, the enrollment data for the user of the remote device, obtain, by the device from the remote device, an update for the enrollment data for the user of the remote device, and render, by the device, the user-associated data corresponding to the user of the remote device by applying the update received from the remote device to the enrollment data for the user of the remote device.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
receiving, by a device from an application running on the device, a first request for information associated with enrollment data associated with a user, wherein the enrollment data is securely stored at the device in storage that is inaccessible by the application;
providing the information associated with the enrollment data to the application;
receiving, by the device from the application, a second request to render user-associated data corresponding to the user, the second request including the information associated with the enrollment data, wherein the user-associated data comprises a three-dimensional representation of a physical environment of the user or a representation of body-related data of the user; and
responsive to the second request:
obtaining, by the device from the storage using the information received from the application, the enrollment data,
obtaining, by the device, an update to the enrollment data, wherein the update to the enrollment data represents a change in a position of the user, and
rendering, by the device, the user-associated data by applying the update to the obtained enrollment data.

2. The method of claim 1, wherein the enrollment data comprises a three-dimensional mesh corresponding to the physical environment of the user, and wherein the update to the enrollment data includes change data for the three-dimensional mesh without receiving the three-dimensional mesh in the update to the enrollment data.

3. The method of claim 2, wherein the update to the enrollment data corresponds to a change in the physical environment of the user as determined using a sensor of the device, and wherein the physical environment includes the user, wherein the sensor senses the change in the position of the user.

4. The method of claim 1, wherein the device includes:
a rendering engine; and
a data manager that has exclusive access to the enrollment data that is securely stored at the device, wherein the data manager:
receives the first request for the information associated with the enrollment data, and
provides the information to the application.

5. The method of claim 4, wherein the rendering engine:
receives the second request to render the user-associated data;
obtains the enrollment data from the storage by requesting the enrollment data from the data manager using the information received from the application;
receives the update to the enrollment data; and
renders the user-associated data by applying the update to the obtained enrollment data.

6. The method of claim 5, wherein the data manager:
stores the enrollment data securely in the storage, in part, by encrypting the enrollment data using a key that is inaccessible outside the data manager; and
stores unencrypted metadata corresponding to the encrypted enrollment data to provide searchable queries of the encrypted enrollment data.

7. The method of claim 1, further comprising, prior to receiving the first request from the application for the enrollment data:
generating, by an enrollment process associated with the user of the device, the enrollment data associated with the user; and
storing the enrollment data securely in storage at the device.

8. The method of claim 7, further comprising:
generating, by a separate enrollment process associated with another user of the device, additional enrollment data associated with the other user; and
storing the additional enrollment data securely in the storage at the device.

9. The method of claim 1, wherein providing the information associated with the enrollment data to the application comprises providing the information without providing the enrollment data to the application.

10. A method, comprising:
receiving, by a device from an application running on the device, a first request for information associated with enrollment data for a user of a remote device, wherein the enrollment data for the user of the remote device is securely stored at the device in storage that is inaccessible by the application;
providing the information associated with the enrollment data for the user of the remote device to the application;
receiving, by the device from the application, a second request to render user-associated data corresponding to the user of the remote device, the second request including the information associated with the enrollment data for the user of the remote device, wherein the user-associated data comprises a three-dimensional representation of a physical environment of the user or a representation of body-related data of the user; and
responsive to the second request:
obtaining, by the device from the storage using the information received from the application, the enrollment data for the user of the remote device,
obtaining, by the device from the remote device, an update for the enrollment data for the user of the remote device, wherein the update to the enrollment data represents a change in a position of the user, and
rendering, by the device, the user-associated data corresponding to the user of the remote device by applying the update received from the remote device to the enrollment data for the user of the remote device.

11. The method of claim 10, further comprising:
establishing, by the device, a secure connection with the remote device;
receiving, by the device, the enrollment data for the user of the remote device via the secure connection; and
storing the enrollment data securely in the storage at the device.

12. The method of claim 10, wherein the enrollment data comprises a three-dimensional mesh corresponding to the physical environment of the remote device, and wherein the update to the enrollment data includes change data for the three-dimensional mesh without receiving the three-dimensional mesh in the update to the enrollment data.

13. The method of claim 12, wherein the update to the enrollment data corresponds to a change in the physical environment of the remote device as determined using a sensor of the remote device, and wherein the physical environment includes the user, wherein the sensor senses the change in the position of the remote user.

14. The method of claim 10, wherein providing the information associated with the enrollment data for the user of the remote device to the application comprises providing the information without providing the enrollment data to the application.

15. The method of claim 10, wherein the device includes:
   a rendering engine; and
   a data manager that has exclusive access to the storage at the device, wherein the data manager:
      receives the first request for the information associated with the enrollment data for the user of the remote device, and
      provides the information to the application.

16. The method of claim 15, wherein the rendering engine:
   receives the second request to render the user-associated data corresponding to the user of the remote device;
   obtains the enrollment data for the user of the remote device from the storage by requesting the enrollment data for the user of the remote device from the data manager using the information received from the application;
   receives the update to the enrollment data from the remote device; and
   renders the user-associated data corresponding to the user of the remote device by applying the update received from the remote device to the enrollment data for the user of the remote device.

17. The method of claim 16, further comprising, with the data manager:
   storing the enrollment data for the user of the remote device securely in the storage, in part, by encrypting the enrollment data for the user of the remote device using a key corresponding to the remote device and a secure communication session with the remote device.

18. The method of claim 17, further comprising deleting the key from the device upon termination of the secure communication session with the remote device.

19. A device, comprising:
   a memory securely storing enrollment data for a user of a remote device in secure storage that is inaccessible by applications at the device; and
   one or more processors configured to:
      receive, from an application running on the device, a first request for information associated with the enrollment data for the user of the remote device;
      provide the information associated with the enrollment data for the user of the remote device to the application;
      receive, from the application, a second request to render user-associated data corresponding to the user of the remote device, the second request including the information associated with the enrollment data for the user of the remote device, wherein the user-associated data comprises a three-dimensional representation of a physical environment of the user or a representation of body-related data of the user; and
      responsive to the second request:
         obtain, from the memory using the information received from the application, the enrollment data for the user of the remote device,
         obtain, by the device from the remote device, an update for the enrollment data for the user of the remote device, wherein the update to the enrollment data represents a change in a position of the user, and
         render, by the device, the user-associated data corresponding to the user of the remote device by applying the update received from the remote device to the enrollment data for the user of the remote device.

20. The method of claim 1, wherein the user-associated data comprises the body-related data of the user, the body-related data including data representing a face of the user, expressions of the user, one or more hands of the user, one or more arms of the user, one or more eyes of the user, hair of the user, eyebrows of the user, facial hair of the user, movements of the user, or gaze information of the user.

21. The method of claim 10, wherein the user-associated data comprises the body-related data of the user, the body-related data including data representing a face of the user, expressions of the user, one or more hands of the user, one or more arms of the user, one or more eyes of the user, hair of the user, eyebrows of the user, facial hair of the user, movements of the user, or gaze information of the user.

* * * * *